(12) United States Patent
Shum et al.

(10) Patent No.: US 6,271,847 B1
(45) Date of Patent: Aug. 7, 2001

(54) INVERSE TEXTURE MAPPING USING WEIGHTED PYRAMID BLENDING AND VIEW-DEPENDENT WEIGHT MAPS

(75) Inventors: Heung-Yeung Shum; Richard S. Szeliski, both of Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/160,898

(22) Filed: Sep. 25, 1998

(51) Int. Cl.[7] .................................................. G06T 1/00

(52) U.S. Cl. .......................... 345/418; 345/430; 345/419

(58) Field of Search ................................... 345/430, 418, 345/419

(56) References Cited

U.S. PATENT DOCUMENTS

| | | | |
|---|---|---|---|
| 6,005,582 | 12/1999 | Gabriel et al. | 345/430 |
| 6,072,496 | 6/2000 | Guenter et al. | 345/419 |

OTHER PUBLICATIONS

C. Bregler, M. Covell, and M. Slaney. Video rewrite: Driving visual speech with audio. Computer Graphics (SIG-GRAPH'97), pp. 353–360, Aug. 1997.

T. Porter and T. Duff. Compositing digital images. Computer Graphics (SIG-GRAPH'84), 18(3):253–259, Jul. 1984.

A. R. Smith and J. F. Blinn. Blue screen matting. In Computer Graphics Proceedings, Annual Conference Series, pp. 259–268, Proc. SIGGRAPH'96 (New Orleans), Aug. 1996. ACM SIGGRAPH.

M. Segal, C. Korobkin, R. van Widenfelt, J. Foran, and Haeberli. Fast shadows and lighting effects using texture mapping. Computer Graphics (SIG-GRAPH92), pp. 249–252, Jul. 1992.

Szeliski et al., "Creating Full View Panoramic Image Mosaics and Envirnoment Maps", Computer Graphics Proceedings, Annual Conference Series, Jul. 1997

[BA83a] P. J. Burt and E. H. Adelson, The Laplacian pyramid as a compact image code. IEEE Transactions on Communications, COM–31(4):532–540, Apr. 1983.

(List continued on next page.)

Primary Examiner—Richard Hjerpe
Assistant Examiner—Lance W. Sealey
(74) Attorney, Agent, or Firm—Lyon, Harr & Defrank, LLP; Richard T. Lyon

(57) ABSTRACT

A system and method for creating weight maps capable of indicating how much each pixel in an image should contribute to a blended image. One such map is a view-dependent weight map created by inputting an image that has been characterized as a collection of regions. A 2D perspective transform is computed for each region that is to be part of the weight map. The transforms are used to warp the associated regions to prescribed coordinates to create a warped image. Once the warped image is created, a Jacobian matrix is computed for each pixel. The determinant of each Jacobian matrix is then computed to establish a weight factor for that pixel. The weight map for the inputted image is created using these computed determinants. Another advantageous weight map is a combination weight map. The process for creating type of weight map is identical to the view-dependant map up to the point the warped image has been created. After that, a first weight factor is computed for each pixel of the warped image using a first weight mapping process. At least one additional weight factor is also computed for each pixel using one or more additional weight mapping processes. The weight factors computed for each pixel are then combined to create a combined weight factor and the weight map is formed from these factors. Preferably, one of the weight mapping processes used to create the combination weight map is the aforementioned view-dependent weight mapping process.

15 Claims, 14 Drawing Sheets

(7 of 14 Drawing Sheet(s) Filed in Color)

OTHER PUBLICATIONS

[BA83b] P. J. Burt and E. H. Adelson. A multiresolution spline with applications to image mosaics. ACM Transactions on Graphics, 2(4):217–236, Oct. 1983.

Wil83 L. Williams. Pyramidal parametrics. Computer Graphics, 17 (3):1–11, Jul. 1983.

[Bli94a] J. F. Blinn. Jim Blinn's corner: Compositing, part 1: Theory. IEEE Computer Graphics and Applications, 14(5):83–87, Sep. 1994.

[Bli94b] J. F. Blinn, Jim Blinn's corner: Compositing, part 2: Practice. IEEE Computer Graphics and Applications, 14(6):78–82, Nov. 1994.

[Che95]S. E. Chen. QuickTime VR –an image–based approach to virtual environmental navigation. Computer Graphics (SIGGRAPH'95), pp. 29–38, Aug. 1995.

[DB97]J. De Bonet. Multiresolution sampling procedure for analysis and synthesis of texture images. Computer Graphics (SIGGRAPH'97), pp. 361–368, Aug. 1997.

[DTM96] P. E. Debevec, C. J. Taylor, and J. Malik, Modeling and rendering architecture from photographs: A hybrid geometry–and image–based approach. Computer Graphics (SIGGRAPH'96), pp. 11–20, Aug. 1996.

[W?97] D. N. Wood et al. Multiperspective panoramas for cel animation. In Com–puter Graphics Proceedings, Annual Conference Series, pp. 243–250, Proc. SIGGRAPH'97 (Los Angeles), Aug. 1997. ACM SIGGRAPH.

[GGSC96]S. J. Gortler, R. Grzeszczuk, R. Szeliski, and M. F. Cohen. The lumigraph. In Computer Graphics Proceedings, Annual Conference Series, pp. 43–54, Proc. SIGGRAPH'96 (New Orleans), Aug. 1996. ACM SIGGRAPH.

[GH86] N. Greene and P. Heckbert. Creating raster Omnimax images from multiple perspective view using the elliptical weighted average filter. IEEE Computer Graphics and Applications, 6(6):21–27, Jun. 1986.

[Hec86] P. Heckbert. Survey of texture mapping. IEEE Computer Graphics and Appli–cations, 6(11):56–67, Nov. 1986.

[HT96] A. N. Hirani and T. Totsuka, Combining frequency and spatial domain for–fast interactive image noise removal. Computer Graphics (SIGGRAPH96), pp. 269–276, Aug. 1996.

[MB95] L. McMillan and G. Bishop. Plenoptic modeling: An image–based rendering system. Computer Graphics (SIGGRAPH'95), pp. 39–46, Aug. 1995.

[Sze96]R. Szeliski. Video mosaics for virtual environments. IEEE Computer Graphics and Applications, pp. 22–30, Mar. 1996.

[Pel81] S. Peleg. Elimination of seams from photomosaics. In Proceedings of the Con–ference on Pattern Recognition and Image Processing, pp. 426–429, Dallas, Texas, Aug. 1981.

[PH97] S. Peleg and J. Herman, Panoramic mosaics by manifold projection. In IEEE Computer Society Conference on Computer Vision and Pattern Recognition (CVPR'97), pp. 338–343, San Juan, Puerto Rico, Jun. 1997.

[SS98]H.–Y. Shum and R. Szeliski. Construction and refinement of panoramic mosaics with global and local alignment. In Sixth International Conference on Computer Vision (ICCV98), pp. 953–958, Bombay, Jan. 1998.

[SS97] R. Szeliski and H.–Y. Shum. Creating full view panoramic image mosaics and texture–mapped models. Computer Graphics (SIGGRAPH97), pp. 251–258, Aug. 1997.

[SHS98] H. Y. Shum, M. Han and R. Szeliski. Interactive construction of 3D models from panoramic mosaics: In IEEE Computer Society Conference on Computer Vision and Pattern Recognition (CVPR'98), pp. 427–433, Santa Barbara, Jun. 1998.

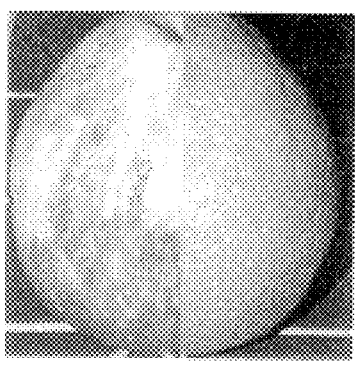 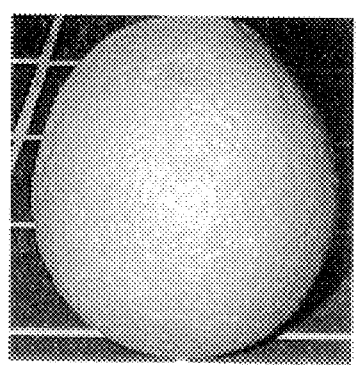 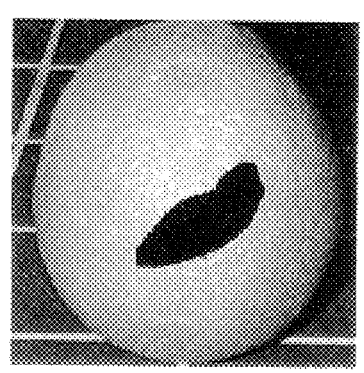
FIG. 7A   FIG. 7B   FIG. 7C
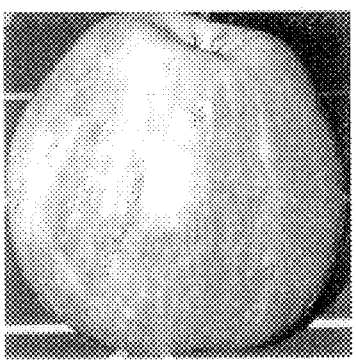 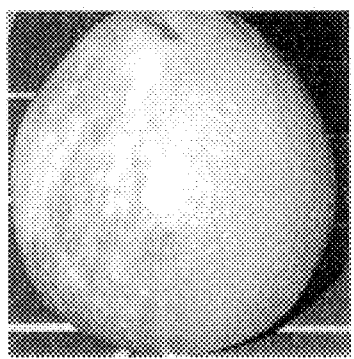 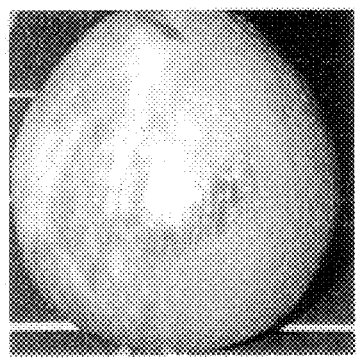
FIG. 7D   FIG. 7E   FIG. 7F
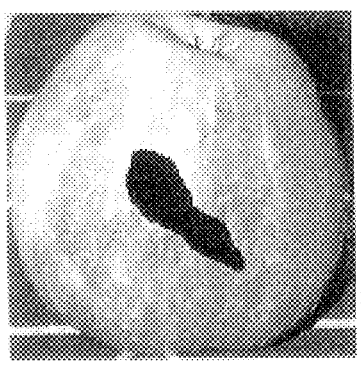 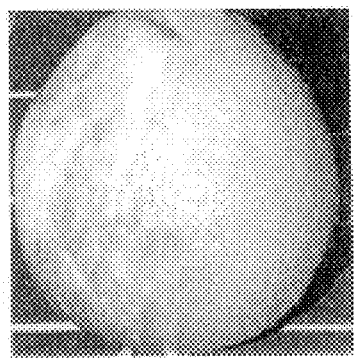 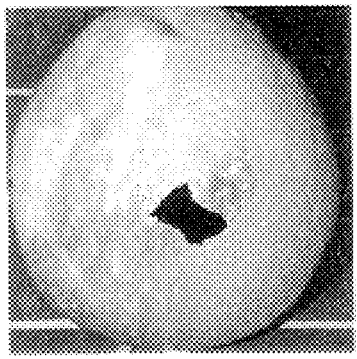
FIG. 7G   FIG. 7H   FIG. 7I

INVERSE TEXTURE MAPPING USING WEIGHTED PYRAMID BLENDING AND VIEW-DEPENDENT WEIGHT MAPS

BACKGROUND

1. Technical Field

The invention is related to inverse texture mapping, and more particularly, to a system and process for inverse texture mapping using weighted pyramid blending and view-dependent weight maps.

2. Background Art

Image-based modeling and rendering has become an important and powerful method to simulate visually rich virtual environments. A traditional method to represent such an environment is to use 3D geometry with some associated texture maps. Many techniques for recovering the 3D geometry of the environment from one or more images have been developed in the photogrammetry, computer vision, and computer graphics communities. These include both automatic techniques [Fau93] and interactive techniques [DTM96].

High quality texture maps are essential for simulating visually rich natural environments. Panoramic mosaics and environment maps [Che95, M1395, and SS97] are examples of rich texture maps used with very simple geometric models (cylinders or cubes).

A number of blending algorithms have been developed to extract texture maps and/or high quality mosaics from multiple images. A general requirement for blending two images is to make the "seams" between them invisible. One common technique is to use linear or nonlinear cross-dissolving or weighted averaging [Pel81, Sze96]. However, choosing a proper cross-dissolving width is a difficult task. Burt and Adelson [BA83b] use a Laplacian pyramid to blend two images in different frequency bands with different blending widths. They can therefore blend without blurring by cross-dissolving in narrower neighborhoods in higher frequency bands, and in wider neighborhoods in lower frequency bands.

Laplacian pyramid blending works very well for splining two overlapping images (joining two images at the centerline without visible seams) and has been widely adopted (e.g., for blending facial masks with face images [BCS97]). However, it cannot be directly applied to the inverse texture mapping problem because it is not designed for images with alpha channels (visibility masks).

Images with alpha channels, typically referred to as alpha-masked images, are widely used in many applications such as image compositing [PD84, Bli94a, Bli94b] and blue-screen matting [SB96]. In the context of inverse texture mapping, images having cutouts due to occlusions, moving objects, and irregular shapes from perspective projection, must often be blended. Alpha-masking the images provides a way to handle such images with cutouts. Specifically, the pixels in the cut-out regions of the images are given zero alpha values. However, as eluded to above, current blending methods are not capable of blending alpha masked images.

In addition, when images are taken from different view points or at different scales (i.e., zoom), they will have very different spatial samplings when projected into the texture map, and therefore contribute content at different spatial frequencies. Images to be blended may also have different exposures. Before such images can be blended, a decision must be made as to how much each image (in fact, each pixel in each image) should contribute to the final, blended texture map.

FIG. 1 illustrates the two foregoing problems in inverse texture mapping. Assume it is desired to create a texture map 10 of the side wall 12 of the building 14 using two images 16, 18. However, the view of the side wall 12 captured in the first image 16 is partially occluded by a tree 20. Similarly, the view of the side wall 12 capture in the second image 18 is partially occluded by another tree 22. In order to obtain a texture map of the side wall 12, the part of the two images 16, 18 depicting the trees must be "cut-out" prior to blending. As discussed above, this can be accomplished using an alpha mask and setting those pixels associated with the trees to zero. One of the problems addressed by the present invention is how to blend images with these cut-out regions (i.e., with alpha masks). Another problem addressed by the present invention is how to blend images having different sampling rates. This is also illustrated in FIG. 1. As can be seen the view of the side wall 12 captured in the first image 16 is directly in front of the wall, whereas the view of the side wall captured in the second image 18 is off to the side of the wall. This means that the first image will provide a better sampling rate of the pixels associated with the side wall 12 than will the second image in the context of image viewpoint. However, it can also be seen that the second image 18 was captured at a greater zoom setting than the first, and so may show more detail (i.e., a higher sampling rate) of the side wall 12 in some areas. Thus, the resulting blended image would be more accurate if the contributions of corresponding pixels in the two images 16, 18 where weighted relative to their sampling rates (and degree of exposure as well) prior to blending. The issue of how to adjust the blending coefficients to account for these differences is addressed by the present invention so that optimal sampling and exposure can be maintained in the blended image.

It is noted that in the preceding paragraphs, as well as in the remainder of this specification, the description refers to various individual publications identified by an alphanumeric designator contained within a pair of brackets. For example, such a reference may be identified by reciting, "reference [DTM96]" or simply "[DTM96]". Multiple references will be identified by a pair of brackets containing more than one designator, for example, [PD84, Bli94a, Bli94b]. A listing of the publications corresponding to each designator can be found at the end of the Detailed Description section.

SUMMARY

Given a 3D model and several images from different viewpoints, an "optimal" texture map can be extracted for each planar surface in the 3D model using an inverse texture mapping process. In particular, a unique weighted pyramid feathering process is employed that extends the traditional Laplacian pyramid blending algorithm to handle alpha masked images and take advantage of weight maps. In this way, it is possible to blend images having cut-out regions, such as those caused by occlusions or moving objects in the images. In addition, the use of a weight map associated with each input image to indicate how much each pixel should contribute to the final, blended texture map, makes it possible to create seamless texture maps.

Specifically, the present invention is embodied in a system and process for inverse texture mapping that uses the aforementioned unique weighted pyramid feathering scheme. First, at least two images of a 3D scene are inputted and any pixel located in a cut-out region of the images is set to a zero value. The 3D scene is characterized as a collection of regions (e.g., triangles). All the regions of the 3D scene which are to be texture mapped are identified in each inputted image. A 2D perspective transform for each identified region is then computed. This transform is capable of projecting the associated region to prescribed texture map coordinates. The 2D perspective transforms are used to warp each identified region to the prescribed texture map coordinates to create a plurality of warped images. A weight map is created for each warped image. As indicated above, the weight maps specify the degree to which each pixel in a particular warped image is to contribute to the final, blended image.

The next step in the overall inverse texture mapping process is to blend the warped images using the weight maps. This generally entails forming an alpha premultiplied image from each warped image and constructing a band-pass Laplacian pyramid from the alpha premultiplied images. In addition, a low-pass Gaussian pyramid is constructed from each of the previously created weight maps. A new composite band-pass Laplacian pyramid is then computed using the band-pass Laplacian pyramids and low-pass Gaussian pyramids associated with the warped images. This computation includes, for each corresponding level of the pyramids, first multiplying each pixel of each warped image by the weight factor associated with that same pixel location in the corresponding weight map to produce a weighted pixel value. The weighted pixel values for each corresponding pixel location in all the warped images are respectively added together and divided by the sum of the weight factors corresponding with that pixel location. Lastly, the blended image is produced by expanding and summing the pyramid levels of the composite band-pass Laplacian pyramid, and compensating for the previously implemented alpha premultiplication of the warped images.

In regards to the alpha premultiplied, this process involves multiplying the R, G and B components of each warped image pixel by the alpha value associated with that pixel. Thus, the preferred alpha premultiplication compensation step involves dividing the R, G, B components of each pixel of the blended image by its alpha value.

It is also preferred that measures be taken to determine whether the warped images are in registration with one another prior to the blending process. If the images are mis-registered, the blended image quality can suffer. If any unacceptable mis-registration is discovered, the warped images are aligned via conventional methods [SS97, SS98].

In addition, it is preferred that, just prior to compensating for the alpha premultiplication in the blended image, the R, G, B and alpha components of each pixel be clipped by first setting any of these components having a value of less than zero to zero, and secondly setting any of the R, G, and B components having a value greater than alpha to the alpha value. This will compensate for any underflow or overflow caused by the pyramid blending process. It is also desirable that a step be added to the general blending process described previously to ensure any cut-out region common to all the input images maintains a zero alpha value. This is accomplished via the use of a logical OR operator following the alpha premultiplication compensation step. Specifically, each pixel of the blended image is compared to a correspondingly located pixel of each of the alpha premultiplied images. Whenever any compared pixel of the blended image coincides with a zero-valued pixel in all of the alpha premultiplied images, it is set to zero no matter what value it obtained during the blending process. Conversely, whenever any compared pixel of the blended image does not coincide with a zero-valued pixel in all of the alpha premultiplied images, it is left unchanged.

While any conventional weight map creation process can be employed with the present invention, such as binary mask, averaging or feather map methods, it is preferred that the weight map be constructed using a unique view-dependent weighting method. This method adjusts the contributions of pixels in the input images such that those providing a greater amount of high-frequency content (i.e., detail) are given a greater weight. Intuitively, the best sampling is obtained when the surface normal is parallel to the camera view direction, and the input image matches the texture map in resolution. The weighting scheme of the present invention takes advantage of the fact that the sampling is related to the Jacobian of the projective image transformation from the texture map coordinates to the original image coordinates (and therefore to its camera viewing transform). A weight map can be constructed to capture the desired relationship between the sampling of the input images and the texture map using the aforementioned relationship.

Particularly, such a weight map can be created by inputting an image that has been characterized as a collection of regions (e.g., triangles). A 2D perspective transform is then computed for each region that is to be part of the weight map. The transforms are used to warp the associated regions to prescribed coordinates, such as those associated with a texture map, to create a warped image. Once the warped image is created, a Jacobian matrix is computed for each pixel. The determinant of each Jacobian matrix is computed to establish a weight factor for that pixel. The weight map for the inputted image is then created using these computed determinants. Of course, when the weight map is to be used in conjunction with the previously-described weighted pyramid feathering process, the steps involved with inputting and warping the image would have already been completed. Thus, only the Jacobian and determinant computation steps need be performed.

A weight map created as described above also has uses beyond the previously described weighted pyramid feathering process. For example, a view-dependent Jacobian-based weight map can be advantageously employed in any blending scheme that involves the use of weighted images.

Another advantageous weight map that can be used for the previously described weighted pyramid feathering process or other applications such as those listed above, is a combination weight map. The initial stages of creating a combination weight map are the same as those described in connection with the view-dependent Jacobian-based weight map. Namely, the image is inputted and perspective transforms are computed for each region in the image that is to become part of the weight map. The perspective transforms are used to warp the regions to a set of prescribed coordinates to create a warped version of the input image. Here again, these steps can be skipped if already performed in connection with the previously described weighted pyramid feathering process.

In the case of the combination weight map, the next step is to compute a first weight factor for each pixel of each warped image using a first weight mapping process and to compute at least one additional weight factor for each pixel using one or more additional weight mapping processes. The weight factors computed for each pixel of each warped image are then combined to create a combined weight factor. In a preferred version of the combination weight map, the weight factors are multiplied together. The combination weight map is created from the combined weight factors. In a preferred embodiment of the present invention, the first weight mapping process is a conventional feather weight mapping process [Sze96] and a single additional weight mapping process is employed. This additional process is preferably the previously-described view-dependent weight mapping process. It has been found this combination of weight maps is useful in creating highly accurate blended images from individual images having substantially different scales (i.e., zoom).

In addition to the just described benefits, other advantages of the present invention will become apparent from the detailed description which follows hereinafter when taken in conjunction with the drawing figures which accompany it.

DESCRIPTION OF THE DRAWINGS

The file of this patent contains at least one drawing executed in color. Copies of this patent with color drawing (s) will be provided by the Patent and Trademark Office upon request and payment of the necessary fee.

The specific features, aspects, and advantages of the present invention will become better understood with regard to the following description, appended claims, and accompanying drawings where:

FIGS. 7A through 7I are images depicting apples and oranges, some with occluded regions, and the results of using the inverse texture mapping process of FIG. 3 to blend the images.

DETAILED DESCRIPTION OF THE PREFERRED EMBODIMENTS

In the following description of the preferred embodiments of the present invention, reference is made to the accompanying drawings that form a part hereof, and in which is shown by way of illustration specific embodiments in which the invention may be practiced. It is understood that other embodiments may be utilized and structural changes may be made without departing from the scope of the present invention.

Figure 2:
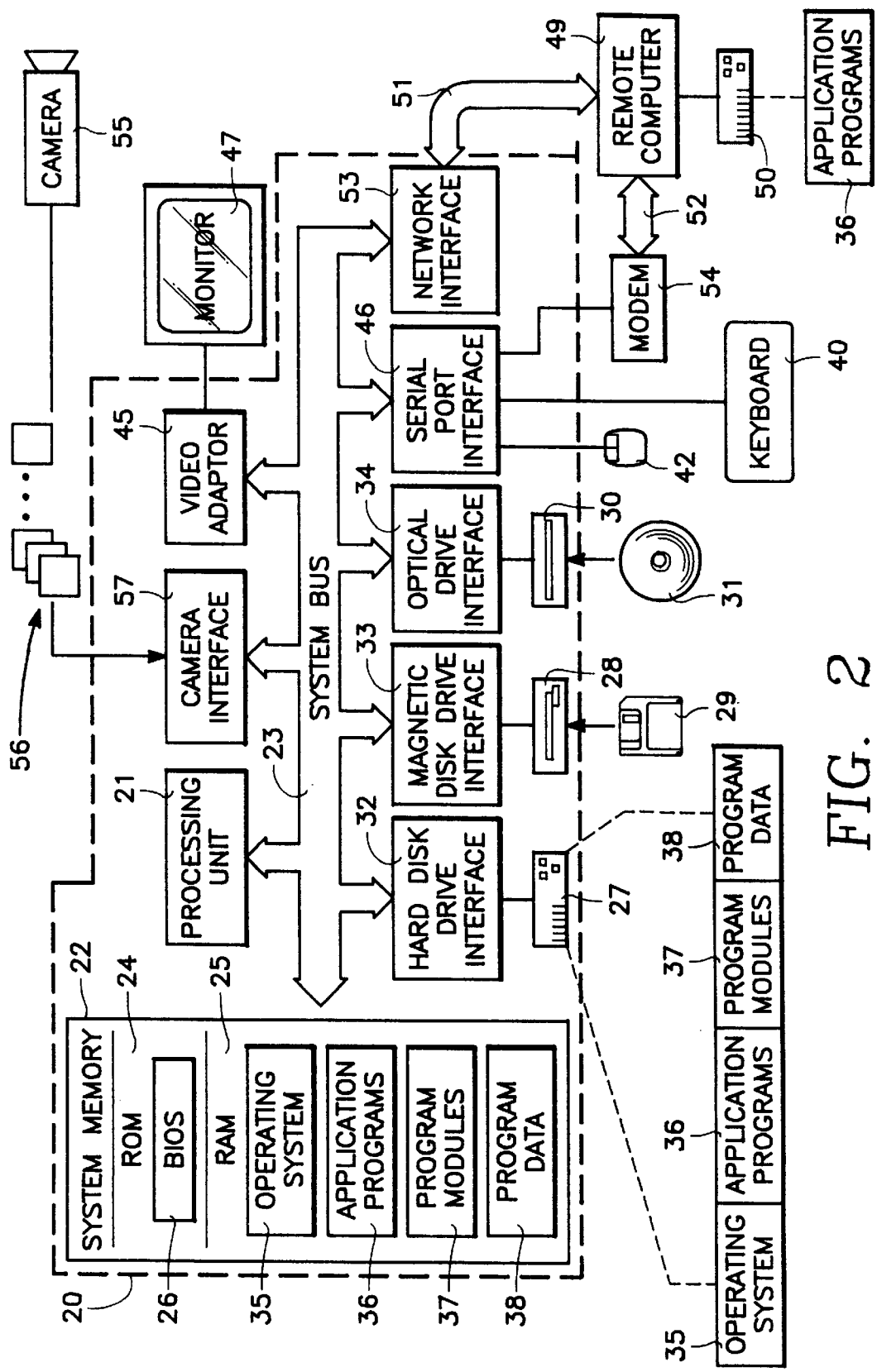
FIG. 2 is a diagram depicting a general purpose computing device constituting an exemplary system for implementing the present invention.

FIG. 2 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 2, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routine that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Of particular significance to the present invention, a camera 55 (such as a digital/electronic still or video camera, or film/photographic scanner) capable of capturing a sequence of images 56 can also be included as an input device to the personal computer 20. The images 56 are input into the computer 20 via an appropriate camera interface 57. This interface 57 is connected to the system bus 23, thereby allowing the images to be routed to and stored in the RAM 25, or one of the other data storage devices associated with the computer 20. However, it is noted that image data can be input into the computer 20 from any of the aforementioned computer-readable media as well, without requiring the use of the camera 55. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 2. The logical connections depicted in FIG. 2 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The exemplary operating environment having now been discussed, the remaining part of this description section will be devoted to a description of the program modules embodying the invention and the testing of these modules. The general approach to texture map recovery assumes that a 3D model has been reconstructed, preferably using automatic algorithms (e.g., structure from motion) or interactive techniques (e.g., [SHS98]). Given the 3D model and multiple images (possibly taken from different viewpoints) and their associated world-to-camera transformations, texture maps can be extracted that are blended seamlessly from all input images. This process is referred to as inverse texture mapping because the input images are projected (through the 3D model) from camera views into the texture view, as opposed to (forward) texture mapping from texture maps (through the 3D model) into the screen view (i.e., a new camera view).

Figure 3:
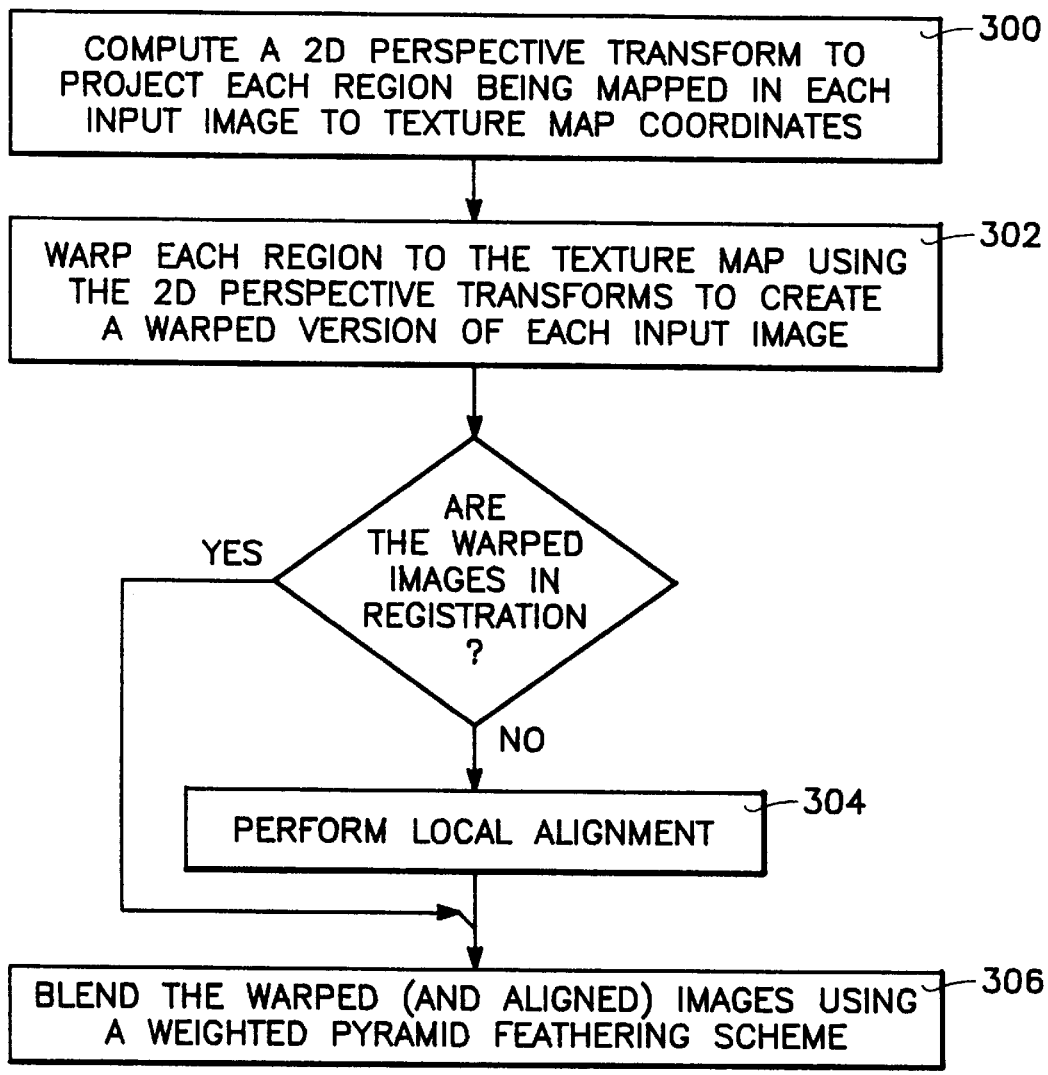
FIG. 3 is a block diagram of an overall process for creating a texture map according to the present invention.

An overview of a preferred inverse texture mapping process embodying the present invention is depicted in FIG. 3. The inverse texture mapping problem is decoupled into one of reconstructing texture maps for any or all planar surfaces (e.g., triangles) in which the 3D model has been divided. For every planar surface in the scene that is to be mapped, the first step 300 in the process is to compute a 2D perspective transform capable of projecting the planar surface from image to texture map coordinates [SS97]. The texture map coordinates (u, v) associated with the vertices of each planar surface are supplied ahead of time, and can either be regular 2D indices (u, v), or 3D homogeneous coordinates (u, v, w), in the case of projective texture maps [SKvW+92]. Each planar surface from each image is then warped via conventional methods using the previously computed 2D perspective transforms to form warped versions of the input images (step 302).

Before the warped images can be blended together, it should be determined whether they are in registration with one another via conventional methods [SS98]. If an unacceptable amount of mis-registration exists, it will be necessary to do local alignment, or "deghosting" [SS98] prior to blending in order to obtain the desired results (step 304). Once any unacceptable mis-registration has been corrected, the warped images are blended using a weighted pyramid feathering scheme (step 306) that will be described in detail later in this description. However, first the weight maps that play an integral part in the blending scheme must be created.

1. Creating Weight Maps

When blending several images to create a texture map, the preferred course of action is to decide how much each image (or more particularly each pixel from each image) contributes to the final texture map. This is accomplished by creating a weight map for each image which dictates on a pixel by pixel basis how much that pixel will contribute to the blended image. These weight maps are then used in the pyramid feathering algorithm as will be described later to create the texture maps. The use of the weight maps for each image facilitates their seamless blending regardless of the differences in sampling (e.g., different viewpoints or different scales) or exposure between the images.

There are many existing weighting schemes that can be adopted for the purpose of producing an acceptable weight map for use with the weighted pyramid feathering process. Two of the more preferred of the existing methods will be presented herein. Namely the binary mask method and the "distance from image contour" method. However, it is not intended to limit the present invention to just embodiments employing these two methods. Rather, any appropriate existing weighting scheme can be employed. For instance, a simple averaging method would be another example of a weighting process that could be employed.

1.1 Binary Masks

The simplest possible weight map is a binary mask which can be associated with each image to dictate which pixels should be used in the texture map and which should not. For each image, a pixel is marked if its distance to its own image center is closer than its distance to any other image center. Otherwise the pixel is not used in blending. This process is similar to constructing the Voronoi diagram of multiple image centers [W+97, PH97]. The binary mask method is particularly effective when images have significant overlaps.

However, when image centers overlap, there are many other choices for the weight map, as well. For example, we can simply choose the left half from one image and the right half from the other image. It should be noted however that these binary masks cannot deal with cut-out regions, nor images taken at different scales.

1.2 Distance From Image Contours

A better heuristic is a weight map which measures the minimum distance of each pixel to the image edges or nearest zero-alpha pixels. In this scheme, the farther a pixel is from the image center, the less important it is. A city-block distance or grassfire transform [RK76] can be used to establish the required distances in this method. Because these distance measures typically weight the center of the image more heavily than edges, it is called a "feather map" when applied to image mosaicing [Sze96, SS97].

The feather map can deal with cut-out regions by simply assigning zero weight to the zero alpha regions. However, a linear feather map (e.g., one employing city-block distance) has an undesirably wide transition zone. To narrow the transition zone, a non-linear feather map $d_1$ can be employed instead. In this scheme, the non-linear feather map $d_1$ is computed from the city-block distance d as $$d_1 = d_{max} * s^2 \quad (1)$$

where $s=0.5*(1.0-\cos(d/d_{max}))$, and $d_{max}$ is the largest city-block distance.

Compared with the Voronoi diagram approach, the non-linear feather map is easier to implement (e.g., no need to check for the Voronoi boundary) and has a more gradual transition.

1.3 View-dependent weight map

Although the previously identified existing weighting scheme can provide acceptable results, in many cases a smoother, more seamless blending is desired than can be obtained using these existing methods. For example, the two heuristics described in detail above ignore the fact that the sampling rates in the texture map and the input images can be very different, particularly when images are taken from different viewpoints or with different magnifications (i.e., zoom). Intuitively, if the image is taken from the left side of the plane, the left part of the image has a better sampling than the right side, and vice versa. By weighting pixels with similar sampling rates more heavily, we can create better quality texture maps. This section presents a unique view-dependant weighting technique that can achieve this goal by taking the sampling from all input images into account.

Figure 10:
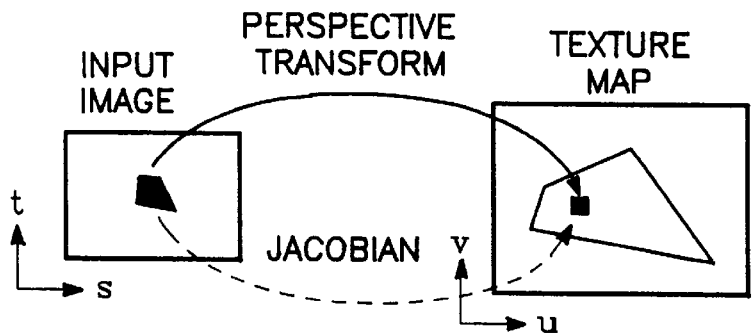
FIG. 10 is a diagram graphically depicting the relationship between an input image and a texture map.

Recall that input images are warped by perspective transforms before being blended [SS97]. FIG. 10 illustrates the relationship between an input image (s, t) and a texture map (u, v). The relationship is an 8-parameter transform:

$$s = \frac{m_0 u + m_1 v + m_2}{m_6 u + m_7 v + 1}, t = \frac{m_3 u + m_4 v + m_5}{m_6 u + m_7 v + 1} \quad (2)$$

A goodness measure of sampling is the change in appearance between a square pixel in the input image and its transformed region in the texture map, as shown in FIG. 10. To evaluate this appearance, we compute the Jacobian matrix:

$$J = \begin{bmatrix} \frac{ds}{du} & \frac{ds}{dv} \\ \frac{dt}{du} & \frac{dt}{dv} \end{bmatrix} = \frac{1}{D^2} \begin{bmatrix} m_0 D - m_6 N_1 & m_1 D - m_7 N_1 \\ m_3 D - m_6 N_2 & m_4 D - m_7 N_2 \end{bmatrix} \quad (3)$$

where $N_1=m_0 u+m_1 v+m_2$, $N_2=m_3 u+m_4 v+m_5$, $D=m_6 u+m_7 v+1$. For affine warping ($m_6=m_7=0$), the Jacobian matrix is a constant.

The determinant of the Jacobian is the area of an (infinitesimal) square pixel in the texture map projected into the input image. The closer this area is to unity, the more similar the sampling rates between the input image and the texture map.

The relative sampling of the texture map and image has been studied in computer graphics as part of the forward texture mapping (or image warping) problem [Hec86, Wol90]. A variety of techniques have been developed for anti-aliasing (pre-filtering) the texture map before sampling [Wil83, GH86, Hec86, Wol90]. However, a view-dependent weight map constructed in accordance with the present invention differs significantly from this previous work in that rather than computing a desired pre-filtering amount (or kernel), a weight (or confidence) associated with each pixel in each image is computed instead.

Figure 11:
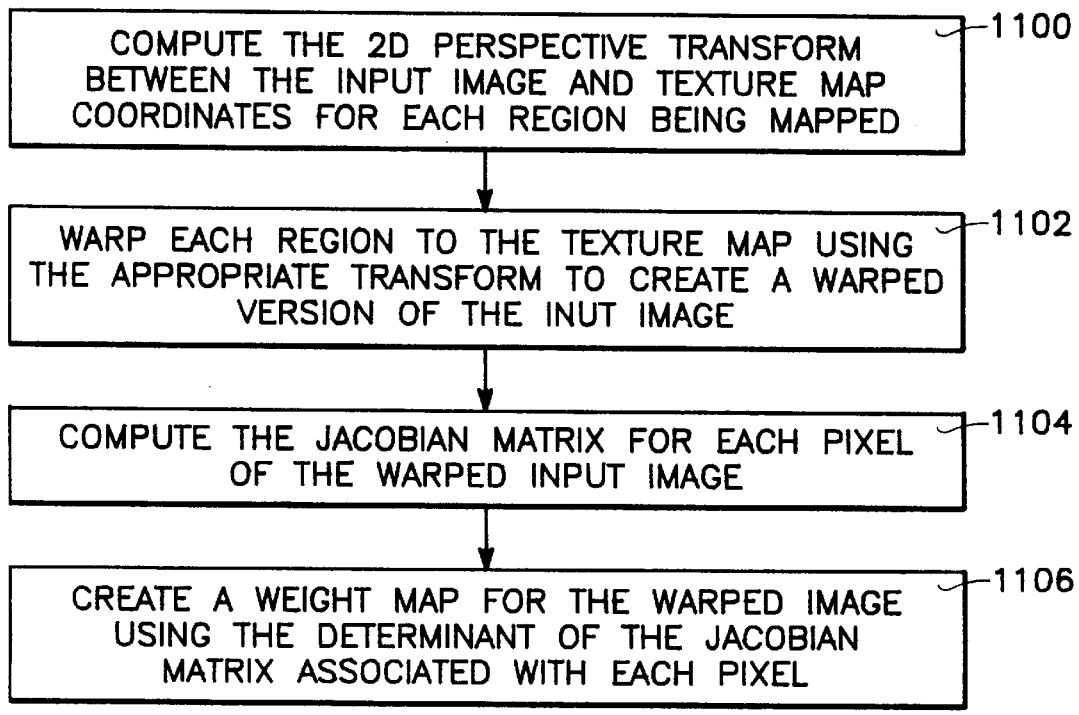
FIG. 11 is a block diagram of a process for creating a view-dependent weight map according to the present invention.

Referring to FIG. 11, a preferred view-dependent weight map embodying the present invention is constructed in the following manner:

a) For each input image, compute the 2D perspective transform between the image and texture map coordinates for each region in the image that is to be texture mapped (step 1100)

b) Warp the regions to the texture map using the transforms (step 1102);

c) Compute the Jacobian matrix for each pixel position (u, v) of each warped input image (step 1104); and d) Create a weight map for each warped image using the determinant of the Jacobian matrix associated with each pixel (step 1106).

$$w(u, v) = |J(u,v)|^2 \text{ for all } u,v \quad (4)$$

The resulting view-dependent, Jacobian-based weight map has been found to be particularly effective when the images have been taken at oblique views, with different scales (zooms), and/or different exposures.

It is noted that computing the 2D perspective transforms and warping the images (steps 1100 and 1102) need not be done if the view-dependent weight map created is being used in conjunction with the weighted pyramid feathering blending scheme of the present invention for inverse texture mapping. The 2D perspective transforms will have already been computed if the weight map is to be used with this blending scheme, as will be described in section 2. Thus, steps 1100 and 1102 are shown in dashed line boxes in FIG. 11 to indicate their optional status.

1.4 Combination weight maps

Figure 12:
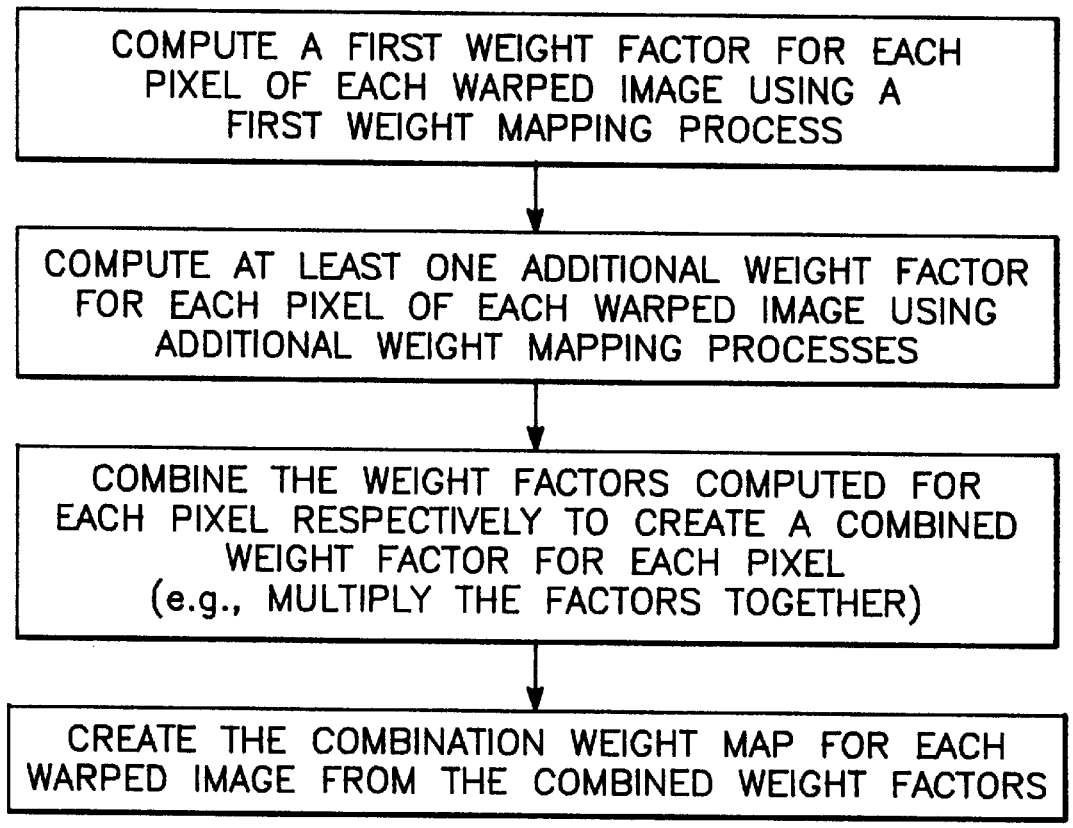
FIG. 12 is a block diagram of a process for creating a combination weight map according to the present invention.

Another possibility in regards to creating a weight map for each warped image prior to implementing the blending process of the present invention is to combine different weighting schemes. It has been found that a combined weight map can provide a better blended image in some circumstances, such as when the images being combined have radically different scales. The process for creating type of weight map is identical to the view-dependant map up to the point the warped image has been created. Referring to FIG. 12, the remainder of the process generally includes computing a first weight factor for each pixel of each warped image using a first weight mapping process (step 1200), and computing at least one additional weight factor for each pixel using additional weight mapping process(es) (step 1202). The computed weight factors for each respective pixel of a warped image are then combined to create a combined weight factor (step 1204). Finally, in step 1206, the combination weight map is created for each warped image from the combined weight factors.

Any appropriate conventional method could be used to combine two or more weight maps associated with an image. However, the preferred method, which was used in a tested embodiment of the present invention, involves multiplying the weight factors together. This results in a combined weight map where each pixel is represented by a weight factor constituting the product of all the individual weight factors associated with that pixel in the weight maps being combined.

2. Blending With Weighted Pyramid Feathering

2.1 Burt and Adelson's Pyramid Blending

A pyramid blending technique capable of seamlessly blending two images was previously developed by P. J. Burt and E. H. Adelson [BA83b] (hereinafter referred to as the Burt and Adelson pyramid blending technique). In this technique, two input images are first decomposed into band-pass pyramids (i.e., Laplacian pyramids [BA83a]) which are blended at different levels and then summed back to the finest level to reconstruct a blended image.

To blend two (completely overlapped) images A and B, according to a given mask, the Laplacian pyramid blending works in the following three steps:

a. Construct Laplacian pyramids LA and LB for images A and B, respectively;

b. Construct a new Laplacian pyramid LS by taking the weighted average of LA and LB at every pyramid level using the given mask;

c. Reconstruct a new image S by summing all levels of LS.

A mask needs to be specified at every pyramid level for proper blending. If the mask is only specified at the lowest level, its Gaussian pyramid can be used for the other pyramid levels. The Gaussian pyramid also makes the transition at the mask contour smoother as it tends to widen the transition zone at coarser levels of the pyramid.

Figure 4:
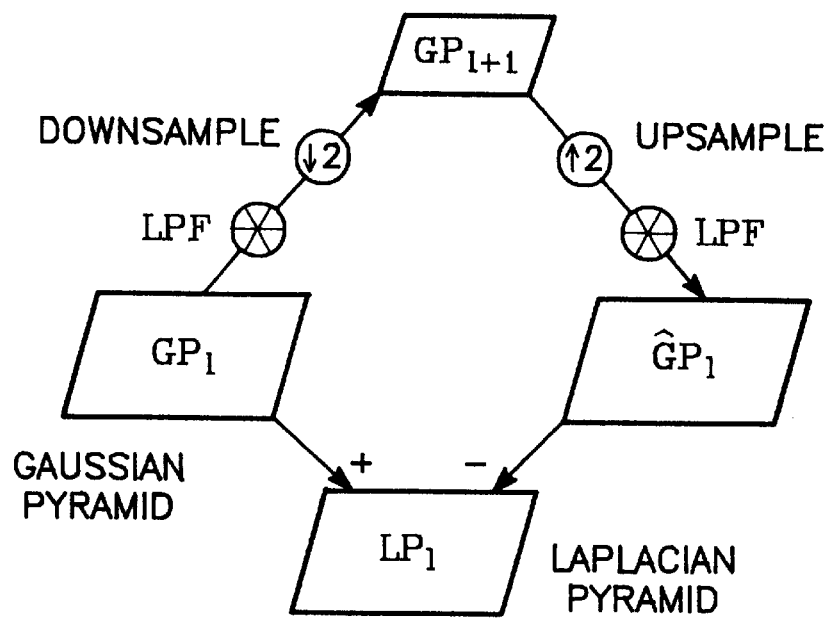
FIG. 4 is a diagram graphically depicting the construction of Gaussian and Laplacian pyramids.

To construct the band-pass pyramid for an image, the first step is to construct its low-pass pyramid (Gaussian pyramid). The Gaussian pyramid is obtained by a REDUCE operation which involves low-pass filtering (i.e., convolving with a small weighting kernel such as a vertical and a horizontal $\{1, 4, 6, 4, 1\}/16$ kernel for a 5×5 window) followed by downsampling. A Laplacian pyramid at level l is the difference between the Gaussian pyramid at level l and the expanded Gaussian pyramid at level l (i.e., expanded using an EXPAND operator from level l+1 to l). The aforementioned expansion process involves is upsampling followed by low-pass filtering. FIG. 4 illustrates the construction of the Gaussian and Laplacian pyramids.

2.2 Pyramid Blending With Alpha

When part of an input image is occluded, that part has to be cut out and should not be used to construct the texture map. Images with cut-out regions can be represented by alpha masks where alpha values inside cut-out regions are set to zero.

To blend two images with alpha masks, it is preferable to use alpha premultiplied images (i.e., $\alpha R$, $\alpha G$, $\alpha B$, $\alpha$), instead of (R, G, B, $\alpha$), as suggested by [PD84] and others. As shown in Blinn's example of downsampling and overlaying [Bli94a], all filtering should be done on alpha premultiplied (associated) colors rather than unmultiplied colors. The use of alpha premultiplied images in the present invention is advantageously employed to construct the aforementioned Laplacian pyramid since the construction and reconstruction of Laplacian pyramid involves a combination of filtering operations (REDUCE, EXPAND, subtraction, etc.). It will be shown that for input images with alpha maps, Laplacian pyramid blending can be easily and correctly applied to all four channels ($\alpha R$, $\alpha G$, $\alpha B$, $\alpha$).

2.3 Weighted Pyramid Feathering

Figure 5A:
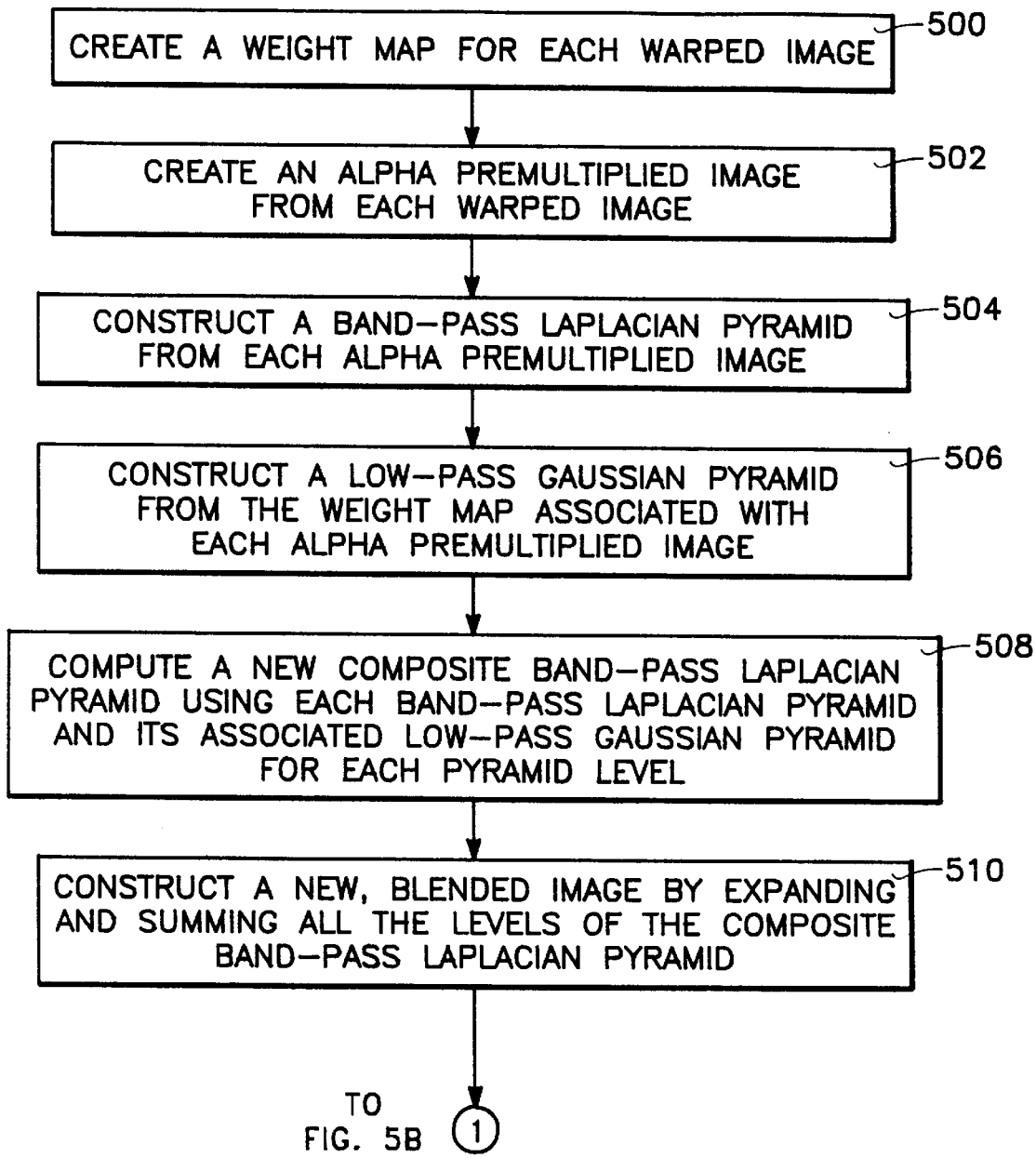
FIGS. 5A and 5B are block diagrams of a process for accomplishing the weighted pyramid feathering blending module of the overall process of FIG. 3.
Figure 5B:
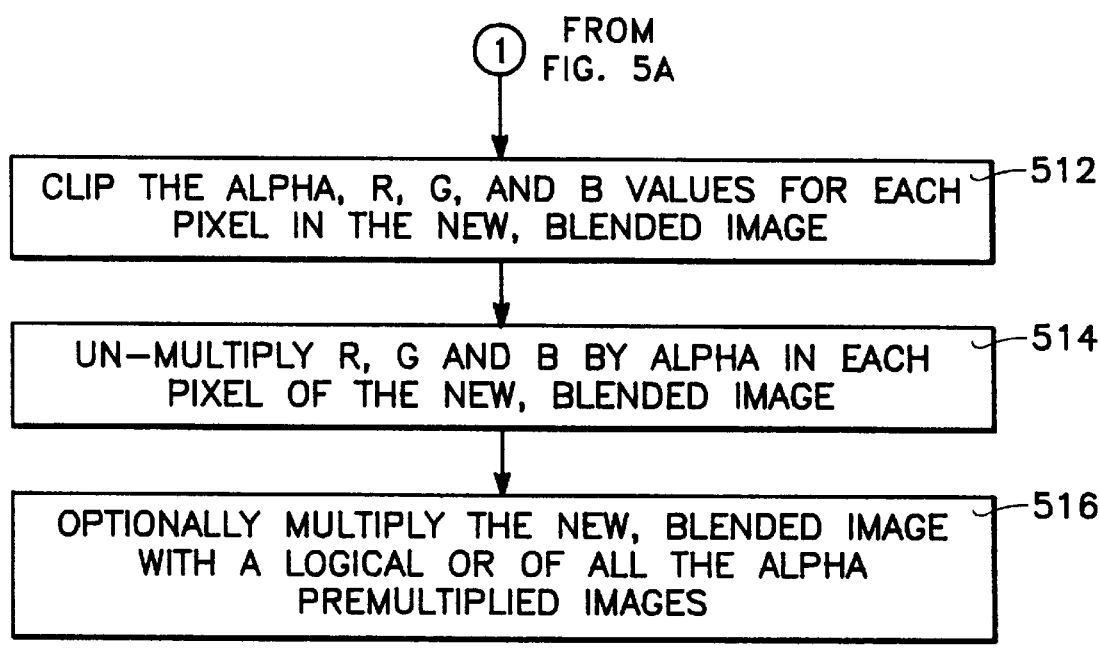

The previously described Burt and Adelson's blending method can be modified to produce a pyramid feathering process embodying the present invention. As illustrated in FIGS. 5A and 5B, this new process includes the steps of:

a) For each warped image k (which is comprised of all the warped regions associated with the image):

(i) create a weight map as described previously (step 500);

(ii) create an alpha premultiplied image from the warped image k as described previously (step 502);

(iii) construct a band-pass Laplacian pyramid $L_k$ from the alpha premultiplied image (step 504); and (iv) construct a low-pass Gaussian pyramid $w_k$ from the weight map (step 506), including setting $w_k=0$ wherever $\alpha_k=0$.

b) Compute a new composite band-pass Laplacian pyramid LS using each band-pass Laplacian pyramid $L_k$ and its associated low-pass Gaussian pyramid $w_k$ for each pyramid level l, via the following equation (step 508):

$$LS^{(l)}(i, j) = \frac{\sum_k (L_k^{(l)}(i, j) \cdot w_k^{(l)}(i, j))}{\sum_k w_k^{(l)}(i, j)}, \quad (5)$$

l indexes the pyramid level where $LS^{(l)}(i, j)$ is set to zero if the sum of all weights of pixel (i, j) at level l is zero.

c) Construct a new, blended image S by expanding and summing all the levels l of the composite band-pass Laplacian pyramid LS (step 510).

At the end of Laplacian reconstruction, there may be overflow and underflow associated with the R, G, B, and/or alpha values. There is no problem that negative alpha values exist at different levels of a band-pass pyramid, but to be able to display the final reconstructed image, alpha should be limited to a number between 0 and 1. It is noted, however, that in practice this range of alpha numbers is typically represented by 8-bit alpha values between 0 and 255. This limiting or clipping operation involves the following (step 512):

a) if α<0, α=0; if R<0, R=0; if G<0, G=0; if B<0, B=0; and b) If R>α, R=α; if G>α, G=α; if B>α, B=α.

Once the clipping operation is complete, the next step 514 is to "un-multiply" R, G, B using the α value (i.e., divide R, G, B by the α value associated with the pixel)

Figure 6A:
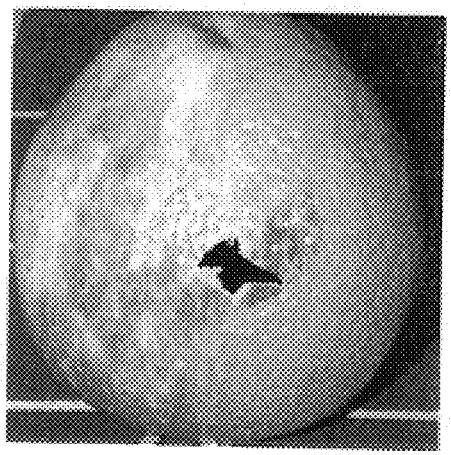
FIGS. 6A and 6B are images depicting the results of the inverse texture mapping process of FIG. 3 shown before the performance of the final logical OR operator step in FIG. 6A and after the performance of the step in FIG. 6B.
Figure 6B:
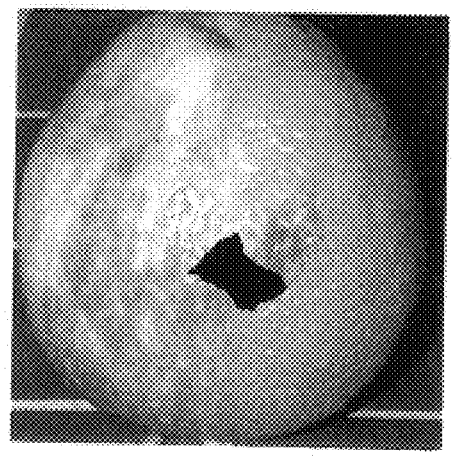

As an optional final step 516, the new image can be multiplied with the logical OR of all the original warped alpha masks, thereby trimming the composite to have non-zero pixels where these exist in all the original images. This final step is necessary if the original alpha map (in particular zero alpha regions) needs to be preserved, because incorrect colors can "bleed" into the zero alpha mask region in the process of Laplacian pyramid reconstruction, as shown in FIG. 6. In operation, if corresponding pixels in all the warped alpha-masked images are assigned a zero value, then the same pixel in the blended image is also assigned a zero value, even if the blending process has produced a pixel value exceeding zero. In this way, any cut-out region common to all the blended images is maintained. Conversely, if any or all of the corresponding pixels in the warped alpha masked images has a non-zero value, then the pixel value of the blended image is maintained as is.

There are two desired properties when we blend two images with alpha masks. First that image A blended with A is still A; and that image A blended with another image B is A, if B is A with a cut-out mask (zero alpha). The first property is satisfied because the reconstruction of the band-pass pyramid is the same as the original image, and the weights are normalized at all pyramid levels. Unfortunately, second property is generally not satisfied around cut-out contours. However, in practice, the reconstruction error of blending the cut-out image B with its original image A, using the foregoing weighted pyramid feathering process, is so small as to be insignificant. For instance, it has been determined experimentally that a blend of the "rotten" orange (FIG. 7C) with the orange (FIG. 7B), or the "rotten" apple (FIG. 7G) with the apple (FIG. 7D) yields a RMS error of 0.6 gray level (i.e., 0.3% relative to intensity value), which is visually indistinguishable.

3. Tested Embodiments

Figure 1:
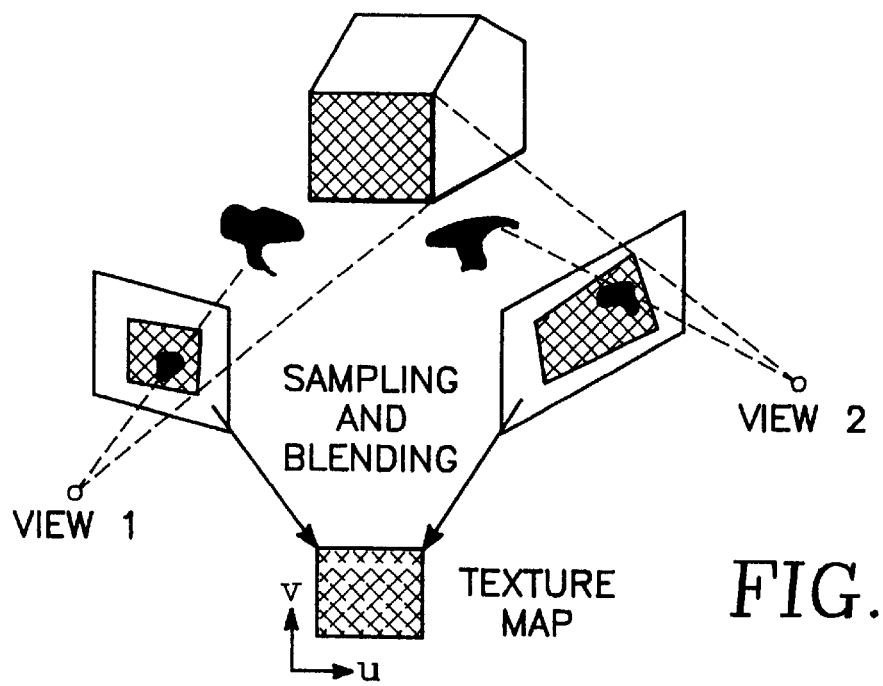
FIG. 1 is a diagram graphically depicting some of the problems associated with creating a texture map of a side of a building using two images of the building taken from different viewpoints, at different scales (i.e., zoom) and each with an intervening object causing an occlusion in the image.

A computer program embodying many of the aspects of the present invention including the weighted pyramid feathering process was coded in visual C++ and run on a conventional PC. The program in its coded form is storable on and can be executed from any appropriate storage medium, such as the hard disk, magnetic disk 29, optical disk 31, ROM 24 or RAM 25 discussed in connection with FIG. 1. The process was applied to a number of images, some of which are detailed below.

By way of an example, the pyramid feathering algorithm was used to blend the image of an apple and an orange, both of which had cut-out zero alpha masks. For comparison, the left half of the apple and the right half of the orange are shown in FIG. 7A. Notice the distinct seam where the two halves of the images meet. When there is no cut-out mask, the weighted pyramid feathering process produced the image shown in FIG. 7E. Notice that the transition between the apple and orange is almost indistinguishable relative to FIGS. 7A. To obtain these striking results, we used weight maps for the apple and the orange as follows, $$w_{apple}(j) = \begin{cases} 1 & \text{if } j \leq L/2 \\ e & \text{otherwise} \end{cases} \text{ and} \quad (6)$$

$$w_{orange}(j) = \begin{cases} 1 & \text{if } i \geq L/2 \\ e & \text{otherwise} \end{cases}$$

where e is a small number (for our examples, we have used 0.1) and L is the image width.

It is also possible to obtain a seamless blending, even with the "rotten" apple and orange images of FIGS. 7C and 7G, respectively, using the weighted pyramid feathering process. The term "rotten" refers to the fact that these images have cut-out regions. As was stated earlier, our method is good at generating texture maps from multiple images even when parts of the images have been cut out. The results of our seamless blending process can seen in FIG. 7F where the image of the "rotten" orange (FIG. 7C) is blended with the image of the intact apple (i.e., 7D). Similarly, this seamless blending process is illustrated in FIG. 7H where the image of the "rotten" apple (FIG. 7G) is blended with the image of the intact orange (i.e., FIG. 7B).

Note that our purpose here is not to fill the hole, nor to synthesize new texture, but to blend two images seamlessly using both apple and orange images. Thus, as depicted in FIG. 7I, the blending of the images of FIGS. 7C and 7G results in a seamlessly blended image, but one exhibiting a cut-out region. If we wished to fill the hole, we could use another orange image (or part of the same orange image) and blend them together. Other conventional hole-filling methods that could be employed include the noise removal method [HT96], pyramidal texture synthesis method [DB97], and push-pull region-filling method [GGSC96].

Figure 8A:
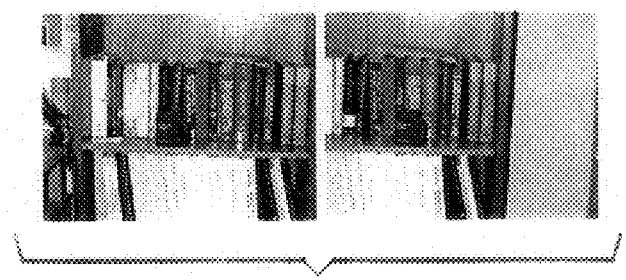
FIGS. 8A through 8D are images depicting a bookshelf used to illustrate the advantages of the inverse texture mapping process of FIG. 3 over conventional feathering schemes when the images being blended have objects which have moved between the time each image was taken.
Figure 8B:
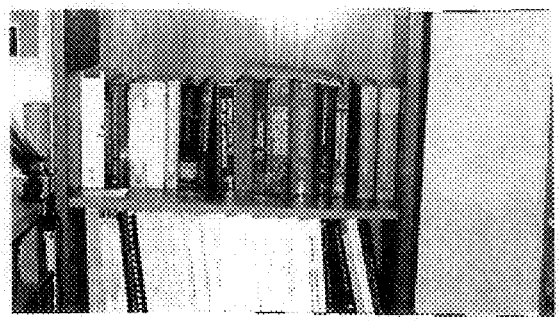
Figure 8C:
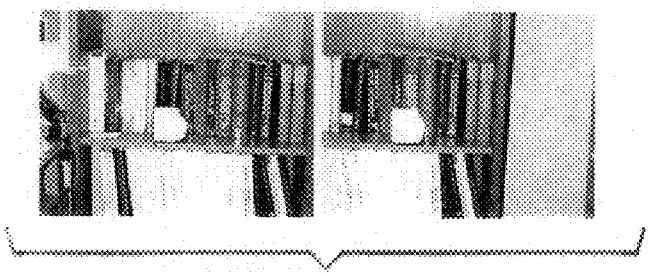
Figure 8D:
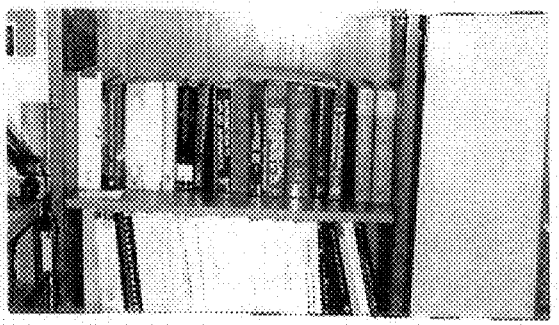

FIGS. 8A–D provide another example where the capability to seamlessly blend images having cut-out regions can be advantageous. FIG. 8A shows two images where a cup has been moved between the time each image was captured. A blended image obtained using a conventional feather blending algorithm exhibits a ghost (or double image) of the cup, as shown in FIG. 8B. To prevent this ghosting problem, the cups can be "cut-out" of each image using an alpha masking process, as shown in FIG. 8C. Applying our weighted pyramid feathering process to the cut-out images in FIG. 8C leads to the seamlessly blended image in FIG. 8D. Notice that the ghost image of the cup seen in FIG. 8B has been eliminated.

Figure 9A:
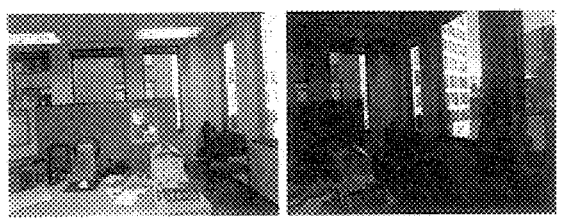
FIGS. 9A through 9D are images depicting the interior of an office used to illustrate the advantages of the inverse texture mapping process of FIG. 3 over conventional averaging and feathering schemes when the images being blended exhibit different exposures.
Figure 9B:
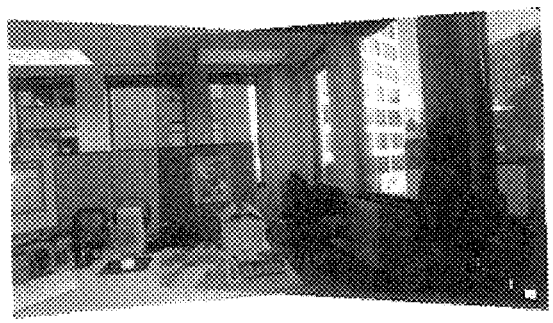
Figure 9C:
Figure 9D:
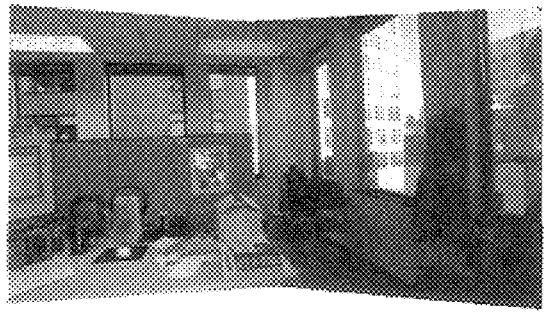

Another key advantage of using the pyramid blending algorithm according to the present invention is that input images having vastly different exposures can be seamlessly blended. FIG. 9A shows two images of the same scene, but with different exposures. FIG. 9B shows the result of using a simple averaging blending method, and FIG. 9C shows the result of using a conventional feathering blending method. The seam between the blended images is quite apparent in the image resulting from the simple averaging methods FIG. 9B). In addition, while somewhat improved, the blended image of FIG. 9C, still exhibits a readily discernable seam at the upper middle part of the composite image. FIG. 9D shows the results of using the weighted pyramid feathering process according to the present invention. As can be seen in this figure, the process results in a seamless mosaic.

Figure 13A:
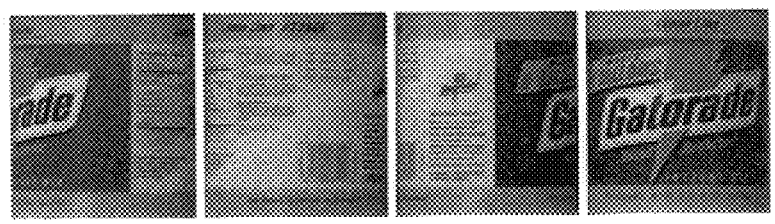
FIGS. 13A through 13E are images depicting a cylindrical object and the creation of a cylindrical texture map for the object, used to illustrate the advantages of the inverse texture mapping process of FIG. 3 when incorporating a view-dependent weight map created in accordance with FIG. 11, over conventional averaging or feathering schemes, as well as a weighted pyramid feathering process using conventional weight maps.

As discussed previously, the use of our view-dependent Jacobian-based weight map is particularly effective when images are taken at oblique views and/or with different scales. This can be illustrated with an example of extracting a texture map for a cylindrical object. FIG. 13A shows four out of eight images used in our experiment. After warping all the images to cylindrical coordinates, we register them before blending. Four different methods are used for blending, namely, simple averaging (FIG. 13B), feathering (FIG. 13C), our weighted pyramid feathering (FIG. 13D) using a feather weight map, and our weighted pyramid feathering (FIG. 13E) using our view-dependent weight map. FIGS. 14A through 14D are comparative views of the same portion of the images in FIGS. 13B through 13E, respectively.

Figure 13B:
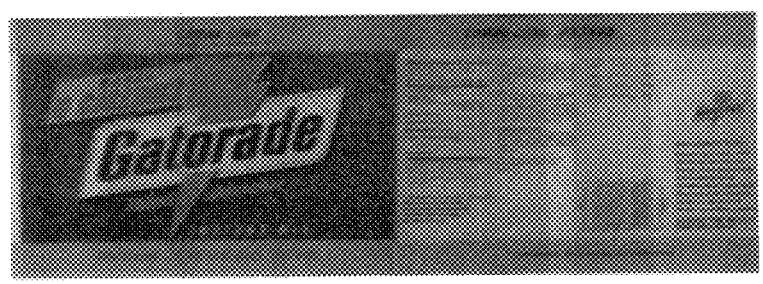
Figure 13C:
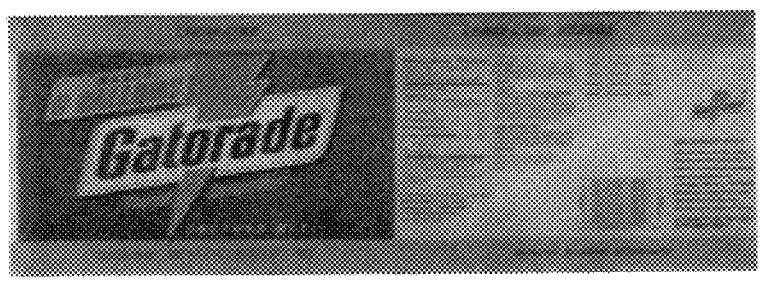
Figure 13D:
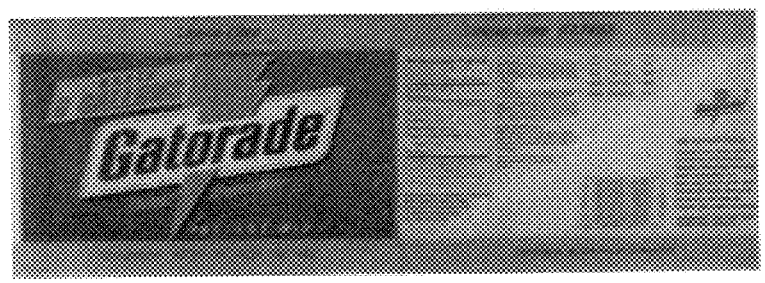
Figure 13E:
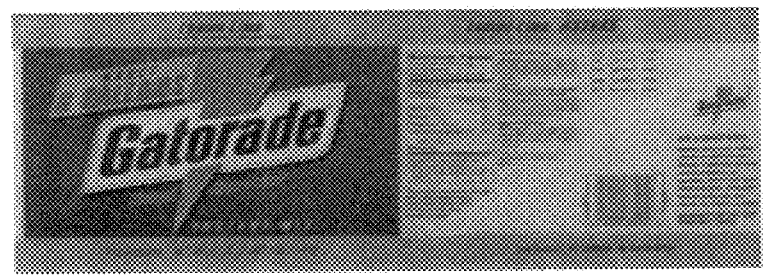
Figure 14A:
FIGS. 14A through 14D are images depicting a portion of the cylindrical weight maps of FIGS. 13B through 13E, respectively.
Figure 14B:
Figure 14C:
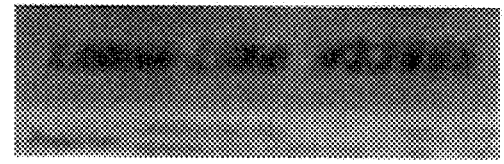
Figure 14D:
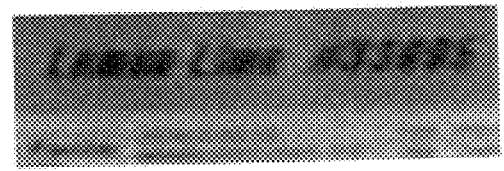

Because of the large amount of illumination variation between the images, averaging and even feathering techniques give very poor results, as can be seen in FIGS. 13B and 13C. Even though the texture map using our weighted pyramid feathering (with a distance-based feather map) generally results in a good blended image (i.e., FIG. 13D), a close-up view of the image as shown in FIG. 14C reveals dark corners near the top and bottom. Of course, these darkened area are not nearly as evident as they are when averaging or feathering weighting schemes are employed (as illustrated in the close-up views shown in FIGS. 14A and 14B, respectively). On the other hand, the texture map constructed using our view-dependent weight map in conjunction with our weighted pyramid blending process produces the best quality blended image as shown in FIGS. 13E and 14D.

The reason that a feather weight map does not work as well as our view-dependent weight map in the weighted pyramid blending process is that the weighting produced by the feather map is not optimal. Note that cylindrical warping unwraps an original image to its cylindrical image only in the horizontal direction, and thus the height of the image is unchanged. However, the best sampling (and largest Jacobian determinant) is at the center vertical line of the image and the worst sampling occurs at pixels on the left and right edges of the image as the surface normals at those pixels become almost perpendicular to the camera viewing direction. Because the regular feather map uses the city-block distance scheme, it assigns small weights to all top pixels regardless of their column numbers. These improper weights at the top and the bottom of the image result in the dark corners seen in the blended images (FIGS. 13D and 14C).

Figure 15A:
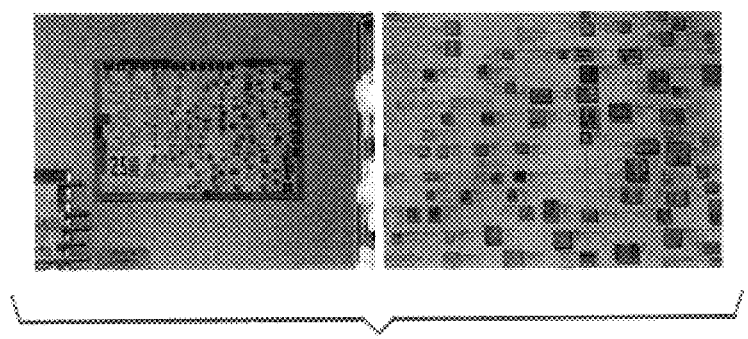
FIGS. 15A through 15C are images depicting a bulletin board used to illustrate the advantages of the inverse texture mapping process of FIG. 3 when incorporating a view-dependent weight map created in accordance with FIG. 11, over a conventional pyramid feathering scheme, when the images being blended have been taken at different scales.
Figure 15B:
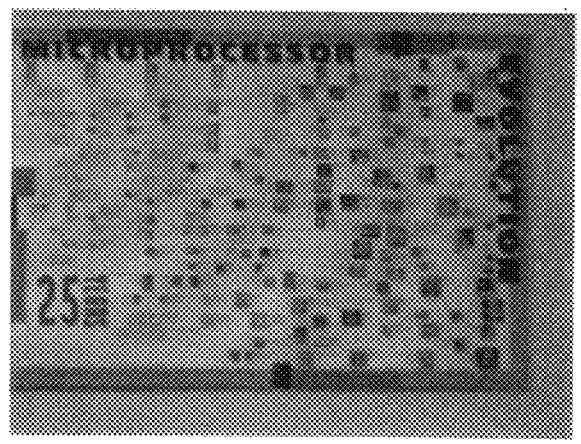
Figure 15C:
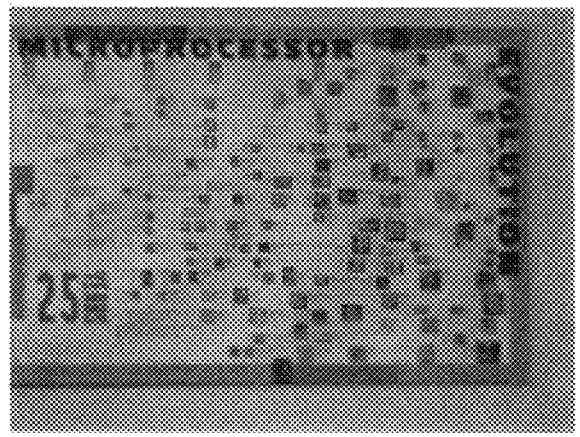

It was explained above that in certain circumstances it is believed a better blended image can be obtain by employing weight maps that combine different types of weight mapping processes. One particularly useful combined weighting scheme combines a view-dependent, Jacobian-based weight map with a feather distance map. It has been found that such a combined weight map provides for better blending of images having radically different scales (i.e., zooms) in the transitional areas between the images. An example of using such a combined weight map is shown in FIGS. 15A–C. FIG. 15A shows the two images to be combined. Simple pyramid feathering results in a blurred image, as shown in FIG. 15B. However, FIG. 15C illustrates that the weighted pyramid feathering technique employing a combined weight map for each image generates a blended image with a sharp interior (where the zoomed-in image is), yet maintains a seamless transition between two images.

References

[BA83a] P. J. Burt and E. H. Adelson. The Laplacian pyramid as a compact image code. *IEEE Transactions on Communications*, COM-31(4):532–540, April 1983.

[BA83b] P. J. Burt and E. H. Adelson. A multiresolution spline with applications to image mosaics. *ACM Transactions on Graphics*, 2(4):217–236, October 1983.

[BCS97] C. Bregler, M. Covell, and M. Slaney. Video rewrite: Driving visual speech with audio. *Computer Graphics (SIGGRAPH'97)*, pages 353–360, August 1997.

[Bli94a] J. F. Blinn. Jim Blinn's corner: Compositing, part 1: Theory. *IEEE Computer Graphics and Applications*, 14(5):83–87, September 1994.

[Bli94b] J. F. Blinn. Jim Blinn's corner: Compositing, part 2: Practice. *IEEE Computer Graphics and Applications*, 14(6):78–82, November 1994.

[Che95] S. E. Chen. QuickTime VR—an image-based approach to virtual environment navigation. *Computer Graphics (SIGGRAPH'95)*, pages 29–38, August 1995.

[DB97] J. De Bonet. Multiresolution sampling procedure for analysis and synthesis of texture images. *Computer Graphics (SIGGRAPH'97)*, pages 361–368, August 1997.

[DTM96] P. E. Debevec, C. J. Taylor, and J. Malik. Modeling and rendering architecture from photographs: A hybrid geometry- and image-based approach. *Computer Graphics (SIGGRAPH'96)*, pages 11–20, August 1996.

[Fau93] O. Faugeras. *Three-dimensional computer vision: A geometric viewpoint*. MIT Press, Cambridge, Mass., 1993.

[GGSC96] S. J. Gortler, R. Grzeszczuk, R. Szeliski, and M. F. Cohen. The lumigraph. In *Computer Graphics Proceedings, Annual Conference Series*, pages 43–54, Proc. SIGGRAPH'96 (New Orleans), August 1996. ACM SIGGRAPH.

[GH86] N. Greene and P. Heckbert. Creating raster Omnimax images from multiple perspective views using the elliptical weighted average filter. *IEEE Computer Graphics and Applications*, 6(6):21–27, June 1986.

[Hec86] P. Heckbert. Survey of texture mapping. *IEEE Computer Graphics and Applications*, 6(11):56–67, November 1986.

[HT96] A. N. Hirani and T. Totsuka. Combining frequency and spatial domain information for-fast interactive image noise removal. *Computer Graphics (SIGGRAPH96)*, pages 269–276, August 1996.

[MB95] L. McMillan and G. Bishop. Plenoptic modeling: An image-based rendering system. Computer Graphics (SIGGRAPH'95), pages 39–46, August 1995.

[PD84] T. Porter and T. Duff. Compositing digital images. *Computer Graphics (SIGGRAPH'84)*, 18(3):253–259, July 1984.

[Pel81] S. Peleg. Elimination of seams from photomosaics. In *Proceedings of the Conference on Pattern Recognition and Image Processing*, pages 426–429, Dallas, Tex., August 1981.

[PH97] S. Peleg and J. Herman. Panoramic mosaics by manifold projection. In *IEEE Computer Society Conference on Computer Vision and Pattern Recognition (CVPR'97)*, pages 338–343, San Juan, Puerto Rico, June 1997.

[RK76] A. Rosenfeld and A. C. Kak. *Digital Picture Processing*. Academic Press, New York, N.Y., 1976.

[SB96] A. R. Smith and J. F. Blinn. Blue screen matting. In *Computer Graphics Proceedings, Annual Conference Series*, pages 259–268, Proc. SIGGRAPH'96 (New Orleans), August 1996. ACM SIGGRAPH.

[SKvW+92] M. Segal, C. Korobkin, R. van Widenfelt, J. Foran, and P. Haeberli. Fast shadows and lighting effects using texture mapping. *Computer Graphics (SIGGRAPH92)*, pages 249–252, July 1992.

[SS97] R. Szeliski and H. -Y. Shum. Creating full view panoramic image mosaics and texture-mapped models. *Computer Graphics (SIGGRAPH97)*, pages 251–258, August 1997.

[SHS98] H. -Y. Shum, M. Han and R. Szeliski. Interactive construction of 3D models from panoramic mosaics. In *IEEE Computer Society Conference on Computer Vision and Pattern Recognition (CVPR'98)*, pages 427–433, Santa Barbara, June 1998.

[SS98] H. -Y. Shum and R. Szeliski. Construction and refinement of panoramic mosaics with global and local alignment. In *Sixth International Conference on Computer Vision (ICCV98)*, pages 953–958, Bombay, January 1998.

[Sze96] R. Szeliski. Video mosaics for virtual environments. *IEEE Computer Graphics and Applications*, pages 22–30, March 1996.

[W+97] D. N. Wood et al. Multiperspective panoramas for cel animation. In *Computer Graphics Proceedings, Annual Conference Series*, pages 243–250, Proc. SIGGRAPH'97 (Los Angeles), August 1997. ACM SIGGRAPH.

[Wil83] L. Williams. Pyramidal parametrics. *Computer Graphics*, 17 (3): 1–11, July 1983.

[Wol90] G. Wolberg. *Digital Image Warping*. IEEE Computer Society Press, Los Alamitos, Calif., 1990.

What is claimed is:

1. A computer-implemented process for creating a view-dependent weight map for an image comprising using a computer to perform the following steps:
   inputting an image;
   identifying regions of the inputted image which are to become part of the weight map;
   computing a 2D perspective transform for each identified region, said transform being capable of projecting the associated region to prescribed coordinates;
   warping each identified region to the prescribed coordinates using the 2D perspective transforms;
   computing a Jacobian matrix for each pixel of each warped region;
   computing the determinant of each Jacobian matrix to establish a weight factor for the associated pixel; and
   creating the weight map of the inputted image using the computed determinants.

2. A system for creating a view-dependent weight map for an image, comprising:
   a general purpose computing device;
   a computer program comprising program modules executable by the computing device, wherein the computing device is directed by the program modules of the computer program to,
   input an image,
   identify regions of the inputted image which are to become part of the weight map,
   compute a 2D perspective transform for each identified region, said transform being capable of projecting the associated region to prescribed coordinates,
   warp each identified region to the prescribed coordinates using the 2D perspective transforms,
   compute a Jacobian matrix for each pixel of each warped region,
   compute the determinant of each Jacobian matrix to establish a weight factor for the associated pixel, and
   create the weight map of the inputted image using the computed determinants.

3. A computer-readable memory for causing a computer to create a view-dependent weight map for an image, comprising:
   a computer-readable storage medium; and
   a computer program comprising program modules stored in the storage medium, wherein the storage medium is so configured by the computer program that it causes the computer to,
   input an image,
   identify regions of the inputted image which are to become part of the weight map,
   compute a 2D perspective transform for each identified region, said transform being capable of projecting the associated region to prescribed coordinates,
   warp each identified region to the prescribed coordinates using the 2D perspective transforms,
   compute a Jacobian matrix for each pixel of each warped region,
   compute the determinant of each Jacobian matrix to establish a weight factor for the associated pixel, and
   create the weight map of the inputted image using the computed determinants.

4. A computer-implemented process for creating a combination weight map for an image comprising using a computer to perform the following steps:
   inputting an image;
   identifying regions of the inputted image which are to become part of the weight map;
   computing a 2D perspective transform for each identified region, said transform being capable of projecting the associated region to prescribed coordinates;
   warping each identified region to the prescribed coordinates using the 2D perspective transforms;
   computing a first weight factor for each pixel of each warped region using a first weight mapping process;
   computing at least one additional weight factor for each pixel of each warped region using at least one additional weight mapping process;
   combining the weight factors computed for each pixel of each warped region to create a combined weight factor; and
   creating said combination weight map of the inputted image using the combined weight factors.

5. The process of claim 4, wherein the first weight mapping process comprises a feather weight mapping process, and wherein said at least one additional weight mapping process comprises a view-dependent weight mapping process.

6. The process of claim 5, wherein the view-dependent weight mapping process comprises the steps of:
   computing a Jacobian matrix for each pixel of each warped region;
   computing the determinant of each Jacobian matrix to establish a weight factor for the associated pixel; and
   creating the weight map for the inputted image using the computed determinants.

7. The process of claim 6, wherein the step of combining the weight factors computed for each pixel of each warped region comprises the step of multiplying together the weight factors associated with a particular pixel location.

8. A system for creating a combination weight map for an image, comprising:
   a general purpose computing device;
   a computer program comprising program modules executable by the computing device, wherein the computing device is directed by the program modules of the computer program to,
   input an image,
   identify regions of the inputted image which are to become part of the weight map,
   compute a 2D perspective transform for each identified region, said transform being capable of projecting the associated region to prescribed coordinates,
   warp each identified region to the prescribed coordinates using the 2D perspective transforms,
   compute a first weight factor for each pixel of each warped region using a first weight mapping submodule, compute at least one additional weight factor for each pixel of each warped region using at least one additional weight mapping sub-module, combine the weight factors computed for each pixel of each warped region to create a combined weight factor, and create said combination weight map of the inputted image using the combined weight factors.

9. The system of claim 1, wherein the first weight mapping sub-module comprises a feather weight mapping sub-module, and wherein said at least one additional weight mapping sub-module comprises a view-dependent weight mapping sub-module.

10. The system of claim 9, wherein the view-dependent weight mapping sub-module comprises sub-modules for:

computing a Jacobian matrix for each pixel of each warped region;

computing the determinant of each Jacobian matrix to establish a weight factor for the associated pixel; and creating the weight map for the inputted image using the computed determinants.

11. The system of claim 10, wherein the program module for combining the weight factors computed for each pixel of each warped region comprises a sub-module for multiplying together the weight factors associated with a particular pixel location.

12. A computer-readable memory for causing a computer to create a combination weight map for an image, comprising:

a computer-readable storage medium; and a computer program comprising program modules stored in the storage medium, wherein the storage medium is so configured by the computer program that it causes the computer to, input an image, identify regions of the inputted image which are to become part of the weight map, compute a 2D perspective transform for each identified region, said transform being capable of projecting the associated region to prescribed coordinates, warp each identified region to the prescribed coordinates using the 2D perspective transforms, compute a first weight factor for each pixel of each warped region using a first weight mapping sub-module, compute at least one additional weight factor for each pixel of each warped region using at least one additional weight mapping sub-module, combine the weight factors computed for each pixel of each warped region to create a combined weight factor, and create said combination weight map of the inputted image using the combined weight factors.

13. The computer-readable memory of claim 12, wherein the first weight mapping sub-module comprises a feather weight mapping sub-module, and wherein said at least one additional weight mapping sub-module comprises a view-dependent weight mapping sub-module.

14. The computer-readable memory of claim 13, wherein the view-dependent weight mapping sub-module comprises sub-modules for:

computing a Jacobian matrix for each pixel of each warped region;

computing the determinant of each Jacobian matrix to establish a weight factor for the associated pixel; and creating the weight map for the inputted image using the computed determinants.

15. The computer-readable memory of claim 14, wherein the program module for combining the weight factors computed for each pixel of each warped region comprises a sub-module for multiplying together the weight factors associated with a particular pixel location.

* * * * *

UNITED STATES PATENT AND TRADEMARK OFFICE
CERTIFICATE OF CORRECTION

PATENT NO.   : 6,271,847 B1
DATED        : August 7, 2001
INVENTOR(S)  : Shum et al.

It is certified that error appears in the above-identified patent and that said Letters Patent is hereby corrected as shown below:

<u>Column 13,</u>
Lines 59-64, equation (6) should appear as follows:

$$w_{apple}(j) = \begin{cases} 1 & \text{if } j \leq L/2 \\ e & \text{otherwise} \end{cases} \text{ and } w_{orange}(j) = \begin{cases} 1 & \text{if } j \geq L/2 \\ e & \text{otherwise} \end{cases}$$

Signed and Sealed this

Twenty-third Day of April, 2002

Attest:

*Attesting Officer*

JAMES E. ROGAN
*Director of the United States Patent and Trademark Office*